United States Patent [19]

Isenberg

[11] Patent Number: 4,748,091

[45] Date of Patent: May 31, 1988

[54] BIPOLAR PLATING OF METAL CONTACTS ONTO OXIDE INTERCONNECTION FOR SOLID OXIDE ELECTROCHEMICAL CELL

[75] Inventor: Arnold O. Isenberg, Forest Hills Boro, Pa.

[73] Assignee: Westinghouse Electric Corp., Pittsburgh, Pa.

[21] Appl. No.: 939,835

[22] Filed: Dec. 9, 1986

Related U.S. Application Data

[62] Division of Ser. No. 714,650, Mar. 21, 1985, Pat. No. 4,648,945.

[51] Int. Cl.$^4$ .............................. H01M 8/12
[52] U.S. Cl. ..................... 429/31; 429/160; 429/161
[58] Field of Search ............ 429/160, 161, 31

[56] References Cited

U.S. PATENT DOCUMENTS

| | | | |
|---|---|---|---|
| 4,490,444 | 12/1984 | Isenberg | 429/31 |
| 4,547,437 | 10/1985 | Isenberg et al. | 429/31 |
| 4,596,750 | 6/1986 | Ruka et al. | 429/31 |
| 4,598,028 | 7/1986 | Rossing et al. | 429/31 |
| 4,598,467 | 7/1986 | Isenberg et al. | 429/31 |

*Primary Examiner*—John F. Niebling
*Assistant Examiner*—Steven P. Marquis
*Attorney, Agent, or Firm*—A. Mich, Jr.

[57] ABSTRACT

Disclosed is a method of forming an adherent metal deposit on a conducting layer of a tube sealed at one end. The tube is immersed with the sealed end down into an aqueous solution containing ions of the metal to be deposited. An ionically conducting aqueous fluid is placed inside the tube and a direct current is passed from a cathode inside the tube to an anode outside the tube. Also disclosed is a multi-layered solid oxide fuel cell tube which consists of an inner porous ceramic support tube, a porous air electrode covering the support tube, a non-porous electrolyte covering a portion of the air electrode, a non-porous conducting interconnection covering the remaining portion of the electrode, and a metal deposit on the interconnection.

14 Claims, 1 Drawing Sheet

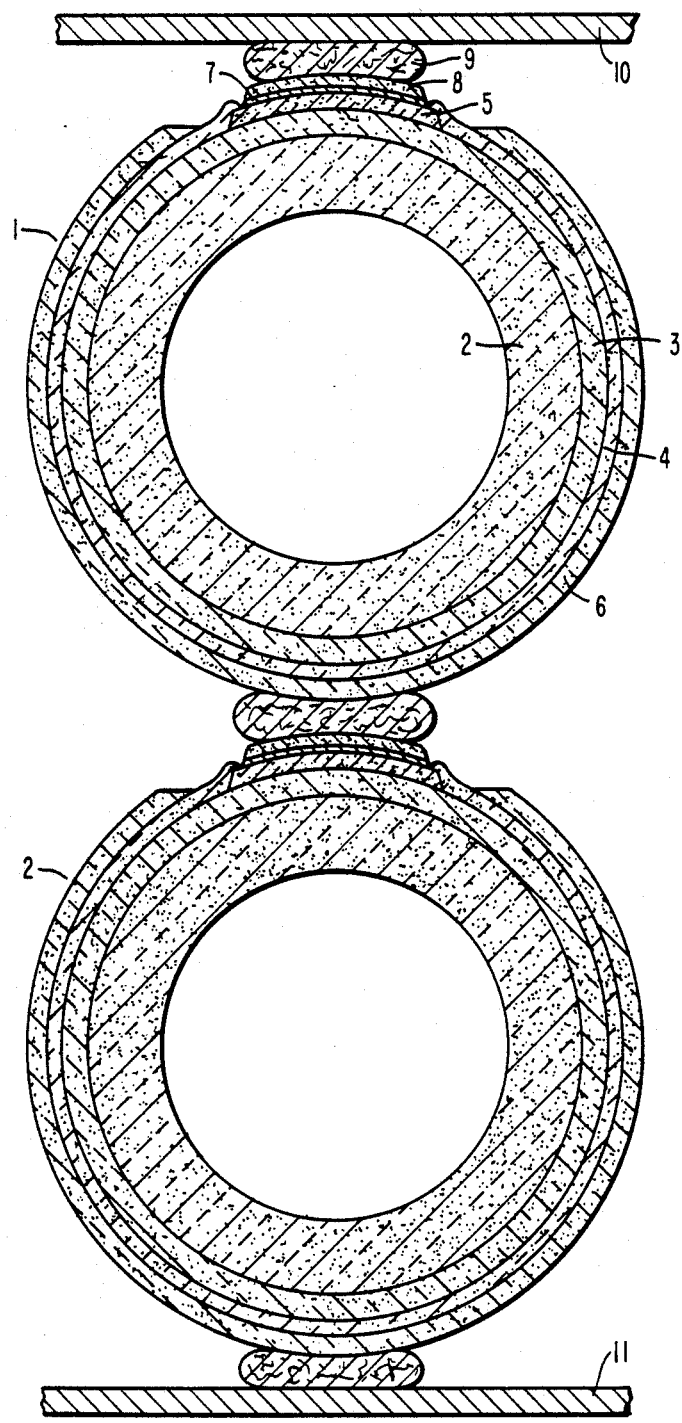

BIPOLAR PLATING OF METAL CONTACTS ONTO OXIDE INTERCONNECTION FOR SOLID OXIDE ELECTROCHEMICAL CELL

This is a division of application Ser. No. 714,650 filed Mar. 21, 1985, now U.S. Pat. No. 4,648,945.

BACKGROUND OF THE INVENTION

A solid oxide fuel cell is an electrochemical cell that burns a fuel to generate heat and electricity. In one embodiment, the fuel cell consists of a multi-layered tube that is electrically connected to other tubes. The electrical connection between the cells is made through a ceramic interconnection (or a fuel electrode material covering the interconnection) on one cell and the fuel electrode, which can be metallic or mixed metallic-ceramic, on an adjacent cell. In between the interconnection of one cell (or the fuel electrode material covering the interconnection of one cell) and the fuel electrode of another cell is placed a spongy nickel felt. The nickel felt permits electrical contact between the two cells to be maintained during cell expansion and contraction which occurs as the cells are heated and cooled. It has been found, however, that the electrical connection between the spongy nickel felt and the interconnection is sometimes poor, which increases the resistance of the cell connections and reduces the efficiency of connected cells. If fuel electrode material covers the interconnection, the poor electrical connection is between the interconnection and the fuel electrode material.

Attempts were made to solve this problem by applying a deposit of nickel on top of the interconnection. However, forming the nickel deposit by conventional techniques, such as sputtering or plasma spraying, are not acceptable processes because they are uneconomical or introduce stresses into the cell structure.

SUMMARY OF THE INVENTION

I have discovered a method of depositing a metal coating on the interconnection of a solid oxide fuel cell. In the process of this invention the coating is electrochemically deposited, with the cathode being inside of the cell and the anode being outside the cell. Electrochemical deposition of metal on the interconnection in this manner is possible because of the particular makeup of the fuel cell. That is, the interconnection is the only exposed portion on the outside of the cell that is conducting at the deposition temperature, so the metal is deposited only on the interconnection and no masking of other portions of the cell is necessary. The inner layers of the cell beneath the interconnection are porous and can be, but need not necessarily be, conducting. Because of these circumstances, ions in a solution inside the fuel cell tube can carry a charge to the interconnection through the underlying layers, and metals can be deposited on the interconnection from a solution on the outside of the tube. In this manner I am able to obtain a metal deposit with low resistance and excellent adherence to the interconnection, so that a good electrical connection can be made between the spongy nickel felt or between the interconnection and the fuel electrode material if fuel electrode material is used over the metal deposit. Moreover, this is accomplished even though no electronic contact is made with the deposit or with the interconnection.

It is somewhat surprising that the method of this invention can successfully produce a good metal deposit because the resistance of the interconnection material is high, so that it is not a good electronic conductor at the plating temperature (400 to 1,000 ohm-cm). One would not expect to be able to reliably plate electrochemically onto a material that is such a poor conductor. But despite the high resistance of the interconnection at the temperature of deposition, a small current passes through the interconnection, while a bipolar potential is impressed upon it. Also, it is surprising that the material underneath the interconnection, for example, a modified lanthanum manganite, is not anodically attacked, because it is an anode relative to the cathode that is placed in the center of the cell tube. Nevertheless, no dissolution or damage to these underlying layers has been found, which is of great importance to the electrical conduction and chemical stability of modified lanthanum manganite and, therefore, to the life and performance of fuel cells (or other electrochemical cells) that are equipped with similar electrodes).

DESCRIPTION OF THE INVENTION

The accompanying drawing is a top view in section, showing a certain presently preferred embodiment of two solid oxide fuel cells electrically connected in series through a metal deposit formed by the process of this invention on the interconnection.

In the drawing, a fuel cell 1 consists of a porous ceramic support tube 2, generally of stabilized zirconia, over which is a porous air electrode 3. A portion of the air electrode is covered with a layer of ceramic electrolyte 4 and the remaining portion is covered with the ceramic interconnection 5. Covering the electrolyte is the nickel-zirconia cermet fuel electrode 6. A metal deposit 7, according to this invention, covers interconnection 5 and optional additional fuel electrode material 8 covers metal deposit 7. A metal felt 9, preferably of nickel, makes the connection between cells, and between the cells and current collectors 10 and 11.

In operation, a tube is inserted into the center of each fuel cell tube and a gas containing oxygen is passed through the inside of the tube to the bottom of the fuel cell tube. Oxygen gas permeates through the porous support tube as it flows between the two tubes. A second gas containing fuel, such as carbon monoxide, hydrogen, or mixtures thereof, is passed over the outside of the fuel cell tubes. When the oxygen migrates as an ion through the fuel cell structure it reacts with the fuel, generating heat and electricity. Additional information on the structure and operation of solid oxide fuel cells can be found in U.S. Pat. Nos. 4,395,468 and 3,400,054, herein incorporated by reference.

In the deposition process of this invention, a fuel cell tube, as shown in the drawing, but without the metal deposit, is immersed in a plating bath. The tube is permanently or temporarily plugged or sealed at one end so that the plating bath solution outside of the tube, which contains ions of the metal to be deposited, does not enter the inside of the tube. The inside of the tube is filled with an ionically conducting fluid, and a DC current flowing from a cathode inside the tube to an anode outside the tube electrodeposits the metal on the interconnection. Of course, if it is desired that the metal be deposited on the inside of the tube, the positions of the two fluids, and of the anode and the cathode, are simply reversed.

Metals that are suitable for electrodeposition according to the method of this invention include platinum, gold, silver, copper, nickel, cobalt, and mixtures thereof. Nickel is the preferred metal because the fuel electrode material presently being used is nickel, and it is not desirable to form alloys with another metal as that might increases the resistance of the fuel electrode.

The bath from which the metal is deposited is an aqueous solution that contains an ion of the metal to be deposited. This solution can be formed from organic or inorganic salts of the above-mentioned metals. Preferably, the anion of the salt should be selected so that it decomposes at elevated temperatures below about 1000° C. to form gases, as that makes it unnecessary to wash the fuel cell tube after the deposition has been completed in order to remove any residual salt. Residual carbon can be tolerated because it will be oxidized automatically during further processing or cell operation. Examples of anions that decompose to form gases at elevated temperatures include tartrate, acetate, citrate, nitrate, hydroxyl, and carbonate ions. For the same reason, the bath should contain no additives that leave residual deposits, such as sulfate, chloride, phosphate, or borate salts. When such salts, or complex commercial plating solutions with proprietary compositions containing such salts, are used, a prolonged watering of the cell tube is required. The concentration of the metal salt in the aqueous solution is not critical, but the preferred concentration is the concentration having the maximum conductivity, as this reduces power requirements.

Inside the fuel cell tube is placed an ionically conducting fluid that can transport a positive charge through the porous layers of the fuel cell to the interconnection. This fluid is an aqueous solution of a compound that has a low resistance and dissociates into ions in water. Suitable compounds include salts or acids such as ammonium acetate, ammonium tartrate, ammonium citrate, ammonium carbonate, acetic acid, tartaric acid, citric acid, and nitric acid. Salt solutions are preferred, as strongly acidic or alkaline compounds may attack the air electrode and damage it. Ammonium salts are particularly preferred because they leave no residues when heated and are readily available. The compound selected for use in forming this solution should be one that decomposes or reacts to form gases when it is heated at temperatures under 1000° C., so that it is not necessary to wash the fuel electrode after the metal has been deposited in order to remove residual traces of the compound. The concentration of the compound in the fluid is not critical but it is preferably selected so that the solution has a maximum conductivity, as that reduces the power required for deposition.

A cathode is placed inside the fuel cell tube in the fluid inside the tube. The cathode may be made of any conducting material including metals such as nickel, copper, or iron, but an inert material such as graphite is preferred.

The anode in the fluid surrounding the fuel cell tube may be either an inert electrode, a sacrificial anode, or the fuel electrode of the fuel cell (6 in the drawing). An inert electrode such as graphite is preferably not used as the anode because it is then difficult to control the volume and concentration of the metal salt in the solution as metal is deposited from the solution onto the interconnection, and fresh solution is added to replace the depleted metal ion. A sacrificial anode is an anode made of the same metal that is being deposited. It is gradually dissolved as the metal is deposited onto the interconnection. Since the fuel electrode is also made of nickel, the fuel electrode itself can be also used as the anode. This is especially useful if the fuel electrode is too dense, since its use as an anode increases its porosity and improves its performance. If the fuel electrode is used as the anode, the positive terminal of the source of direct current is simply attached to it.

The temperature of deposition may vary, but about 50° to about 70° C. is preferable for the bath, as lower temperatures may produce a porous deposit with poor adhesion and lack of uniformity, and higher temperatures are of no additional advantage. The deposition should continue until the desired deposit thickness is reached. A thickness of about 1000 Angstroms to about 20 microns is desirable as a thinner deposit may not cover all of the interconnection and a thicker deposit may tend to flake off.

The amperage and voltage of the direct current used are not particularly critical. A good procedure is to calculate the number of coulombs required to deposit a coating of the desired thickness and then adjust the amperage and time accordingly. The current density should also be adjusted, as is known in the art, to avoid excessive gasing at the deposit as that may produce deposits that are excessively brittle and/or poorly adhering.

Once the metal has been deposited on the interconnection of the fuel cell, the fuel electrode type material can be deposited over it. It is possible to deposit the metal on the interconnection before or after the fuel electrode layer. If fuel electrode material is to be deposited over the metal or the interconnection, the metal is deposited first, so that both the fuel electrode and the fuel electrode material can be deposited in one and the same processing step. A number of fuel cell tubes are then stacked, as shown in the drawing, to form a fuel cell assembly. The method of this invention is applicable to other solid oxide electrochemical cells, including oxygen gauges, electrolyzers, and gas sensors.

The following examples further illustrate this invention.

EXAMPLE

A fuel cell tube as shown in the drawing, but without the metal deposit on it, was immersed, sealed end down, in an aqueous bath containing 200 grams per liter of nickel acetate. An aqueous solution of 200 grams per liter of ammonium tartrate was poured inside the fuel cell tube. A graphite rod 6 mm in diameter was placed inside the tube in the ammonium tartrate solution as the cathode, and two nickel bars 3 mm × 8 mm were placed in the aqueous bath outside the tube as the sacrificial anode. The temperature of the nickel acetate was 60° C. and the area of the interconnection was 16 cm$^2$. A direct current of 200 mA was applied and the amperage was gradually increased to 600 mA within one minute. After about 10 minutes the fuel cell tube was removed from the bath and examined. A strongly adherent deposit of nickel about 1 micron in thickness had formed on the interconnection. The deposit was firmly attached and covered the entire surface of the interconnection. Fuel electrode material was deposited on the metal deposit and the tubes were stacked together in series with nickel felt in between to form a fuel cell assembly as shown in the drwing. A stack of three such fuel cells performed efficiently with low resistance between the cells for over one year.

I claim:

1. A multi-layered solid oxide fuel cell tube comprising:
   (1) an inner porous ceramic support tube;
   (2) a porous air electrode covering said support tube;
   (3) a non-porous ceramic electrolyte covering a portion of said air electrode;
   (4) a non-porous electronically conducting ceramic interconnection covering another portion of said air electrode;
   (5) a metal deposit on said interconnection; and
   (6) a metal fuel electrode covering said electrolyte 2. A fuel cell tube according to claim 1, wherein said metal deposit is selected from the group consisting of nickel, cobalt, copper, platinum, silver, gold, and mixtures thereof.

3. A fuel cell tube according to claim 1 wherein said metal deposit is nickel.

4. A fuel cell tube according to claim 1 wherein said metal deposit is about 1000 Angstroms to about 20 microns thick.

5. A fuel cell tube according to claim 1 wherein said metal deposit is covered with a layer of fuel electrode material.

6. In a multi-layered solid oxide fuel cell tube having a non-porous electronically conducting ceramic interconnection on an air electrode, the improvement which comprises a metal deposit on said interconnection.

7. A fuel cell tube according to claim 6, wherein said metal deposit is selected from the group consisting of nickel, cobalt, copper, platinum, silver, gold, and mixtures thereof.

8. A fuel cell tube according to claim 6 wherein said metal deposit is nickel.

9. A fuel cell tube according to claim 5 wherein said metal deposit is about 1000 Angstroms to about 20 microns thick.

10. A fuel cell tube according to claim 6 wherein said metal deposit is covered with a layer of fuel electrode material.

11. In a solid oxide electrochemical cell having a non-porous electronically conducting ceramic interconnection which provides an electrical connection to another similar cell, the improvement which comprises a layer of metal bonded to said interconnection.

12. An improvement according to claim 11 wherein said metal is nickel.

13. An improvement according to claim 11 wherein said layer is about 1000 Angstroms to about 20 microns thick.

14. An improvement according to claim 11 wherein said layer is covered with a layer of fuel electrode material.

* * * * *